United States Patent
Mehew et al.

(10) Patent No.: US 9,218,510 B2
(45) Date of Patent: Dec. 22, 2015

(54) PERSONAL WRITING DEVICE WITH USER RECOGNITION CAPABILITIES AND PERSONAL INFORMATION STORAGE

(75) Inventors: Evans Mehew, Larkspur, CO (US); Scott Paintin, Littleton, CO (US); Dianna Lyons, Highlands Ranch, CO (US); Julene M. Robbins, Centennial, CO (US)

(73) Assignee: The Western Union Company, Englewood, CO (US)

( * ) Notice: Subject to any disclaimer, the term of this patent is extended or adjusted under 35 U.S.C. 154(b) by 743 days.

(21) Appl. No.: 12/821,681

(22) Filed: Jun. 23, 2010

(65) Prior Publication Data

US 2011/0316665 A1    Dec. 29, 2011

(51) Int. Cl.
| | |
|---|---|
| *G05B 19/00* | (2006.01) |
| *G06K 9/00* | (2006.01) |
| *G06K 9/22* | (2006.01) |
| *G06F 21/00* | (2013.01) |
| *G06F 21/79* | (2013.01) |
| *G06F 21/32* | (2013.01) |

(52) U.S. Cl.
CPC ............. *G06F 21/79* (2013.01); *G06F 21/32* (2013.01)

(58) Field of Classification Search
USPC ............................................ 340/5.52
See application file for complete search history.

(56) References Cited

U.S. PATENT DOCUMENTS

| | | | |
|---|---|---|---|
| 5,280,527 A | 1/1994 | Gullman et al. | |
| 5,774,602 A * | 6/1998 | Taguchi et al. | 382/314 |
| 6,154,879 A | 11/2000 | Pare et al. | |
| 6,307,956 B1 * | 10/2001 | Black | 382/124 |
| 6,594,376 B2 | 7/2003 | Hoffman et al. | |
| 6,839,453 B1 * | 1/2005 | McWilliam et al. | 382/119 |
| 7,279,646 B2 * | 10/2007 | Xu | 178/18.01 |
| 7,343,299 B2 * | 3/2008 | Algazi | 705/60 |
| 7,793,109 B2 * | 9/2010 | Ortiz | 713/186 |
| 8,079,079 B2 * | 12/2011 | Zhang et al. | 726/19 |
| 2002/0091937 A1 | 7/2002 | Ortiz | |
| 2002/0170885 A1 | 11/2002 | Krenz | |
| 2007/0046649 A1 * | 3/2007 | Reiner | 345/173 |
| 2007/0235532 A1 | 10/2007 | Lapstun et al. | |
| 2010/0283766 A1 * | 11/2010 | Shieh | 345/179 |
| 2011/0316665 A1 | 12/2011 | Mehew et al. | |
| 2011/0320352 A1 | 12/2011 | Mehew et al. | |

* cited by examiner

*Primary Examiner* — Jennifer Mehmood
*Assistant Examiner* — John Mortell
(74) *Attorney, Agent, or Firm* — Kilpatrick Townsend & Stockton LLP (57) ABSTRACT

Systems and method for a handheld biometrically secured user input device are described. A biometric authentication device may be coupled with a handheld enclosure, the biometric authentication device capable of collecting user authentication information from a user to authenticate the user's identity. A computer-readable storage device may be coupled with the handheld enclosure for storing confidential financial information of the user, wherein access to the confidential financial information is granted only after the user's identity has been authenticated. A sensor may be coupled with the handheld enclosure, capable of capturing the user's handwriting. Also, a communication device may be configured to transmit information gathered with the sensor to a computer system.

10 Claims, 6 Drawing Sheets

PERSONAL WRITING DEVICE WITH USER RECOGNITION CAPABILITIES AND PERSONAL INFORMATION STORAGE

CROSS-REFERENCES TO RELATED APPLICATIONS

This application is related to U.S. Pat. No. 9,141,955, filed Jun. 23, 2010, and entitled "Biometrically Secured User Input for Forms." This application is also related to co-pending U.S. application Ser. No. 12/821,655, filed Jun. 23, 2010, and entitled Multi-User Device with Information Capture Capabilities. Each of the above-referenced, patents/applications are hereby incorporated by reference for all purposes.

BACKGROUND OF THE INVENTION

Each day, people throughout the nation and the world conduct thousands of transactions over the Internet. These transactions may be purchase transactions, such as buying goods or services from an Internet-based or retail merchant. These transactions may also be banking transactions, such as transferring funds between accounts or paying bills. Still other Internet-based or retail transactions may be money transfers to other persons. While the majority of people conduct legitimate business, a percentage of people attempt to conduct illegal or fraudulent transactions, such as using a stolen credit card number to make a purchase or fraudulent money transfer.

In some online transactions, the user may be required to input her account number (such as a credit card number, debit card number, stored value card number, account number held with a money transfer service provider, etc.), a security code associated with the transaction card, and/or her billing address. Unfortunately, all of this information might be acquired by stealing the user's transaction card and learning her address from one of many sources, such as the phonebook.

In other situations, possibly prior to using a website, a user may need to agree to an online contract (such as a "terms of use" agreement). This may require the user to acknowledge that she has viewed a particular document by electronically signing her name. However, as with many web-based entities, a criminal may easily "sign" someone else's name simply by typing it in or otherwise accepting the contract. In other instances, it may be preferable for a user to input data to a computer via handwriting. Again (particularly when the transaction is occurring remotely via the Internet), it may be difficult or impossible to verify that the person providing the handwriting is indeed who she says she is.

To reduce the number of fraudulent transactions, and increase security, an improved way of authenticating the identity of a user attempting to conduct transactions is needed. Further, any improvement for authenticating the user should be convenient and unobtrusive to the user.

The invention solves these and other problems.

BRIEF SUMMARY OF THE INVENTION

A biometrically secured user input device may allow a user to be authenticated before allowing the user to input or access stored information. For example, a user may provide biometric data to the user input device. This biometric data may then be compared to previously stored biometric data at the user input device (or stored external to the user input device, such as at a computer system). If the user's identity is authenticated, confidential information, such as biographical information, financial account numbers, and/or loyalty account numbers stored on the user input device, may become accessible to the user. In some embodiments, after the user's identity has been authenticated, the user will be allowed to provide input, such as a signature, via the user input device, to a third party, such as an Internet-based merchant.

In some embodiments, a handheld biometrically secured user input device is described. The device may include a handheld case or enclosure. The device may include a biometric authentication device coupled with the handheld case capable of collecting user authentication information from a user to authenticate the user's identity. The device may include a computer-readable storage device coupled with the handheld case for storing confidential information of the user. Access to the confidential information may be granted only after the user's identity has been authenticated. The device may include a sensor, coupled with the handheld case, that may be capable of capturing the user's handwriting. The device may include a communication device that may be configured to transmit information gathered with the sensor to a computer system.

In some embodiments, the biometric authentication device comprises a handwriting analyzer and/or a fingerprint scanner. In some embodiments, the sensor that is capable of capturing the user's handwriting comprises a camera that images ink transferred to the writing medium. In some embodiments, the user input device may have an ink reservoir coupled with the handheld case. Ink may be stored in the ink reservoir. Also a tip for transferring ink to a writing medium may be present.

In some other embodiments, a method for authenticating a user and receiving user input using a handheld biometrically secured user input device is described. The method may include providing a handheld biometrically secured user input device. The method may include receiving, by the input device, biometric information from the user. The method may include comparing the biometric information received from the user to a previously stored sample of biometric information received from the user. The method may include determining, using the biometric information, and the previously stored sample of biometric information, that the user's identity has been authenticated. The method may include receiving, by the input device, confidential information from the user. The confidential information may comprise handwriting. The confidential information may be received after the user's identity has been authenticated. The method may include transmitting, by the input device, at least a portion of the confidential information from the input device to a computer system.

In some embodiments, a handheld biometrically secured user input device is described. The user input device may include a biometric authentication device configured to collect biometric information from a user to authenticate a user's identity. The user input device may include a first computer-readable storage device configured to store previously collected biometric information of the user. The user input device may include a sensor configured to capture the user's handwriting. The user input device may include a communication device configured to transmit information gathered with the sensor to a computer system. The user input device may include a second computer-readable storage medium, separate from the user input device, configured to store confidential information of the user. Access to the confidential information may be granted only after the user's identity has been authenticated.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components.

DETAILED DESCRIPTION OF THE INVENTION

A biometrically secured user input device may be used to increase the likelihood that information provided by a user is authentic. A biometrically secured user input device may allow a user to authenticate his identity prior to accessing and/or inputting data that may be confidential. Such a user input device may be in the form of a handheld device, such as a pen. The pen may contain a computer-readable storage device that stores biometric profiles of one or more users. These biometric profiles may be used to authenticate a user when he provides a biometric sample to the user input device. After the user's identity has been authenticated, the user may be granted access to information linked to the user that is stored either at the user input device, a computer system, and/or a third-party computer system. In some embodiments, after the user's identity has been authenticated, the user may provide input using the user input device.

Such a user input device may provide many advantages. For example, a user may be able to securely store account numbers, such as credit card numbers, on the user input device, computer system, or third-party computer system. Also, consider the example of a money transfer over the Internet. The user may open a website of a money transfer provider, such as WESTERN UNION, and initiate a money transfer transaction. At some point during the transaction, the user may be prompted to authenticate his identity. The user may then provide a biometric identifier to the user input device, such as a handwriting sample (e.g., stroke, speed, pressure, etc.), fingerprint, voiceprint, retina scan, etc. Once the user's identity has been authenticated, payment and/or other (e.g., biographical, loyalty) information may be sent from the user input device to the money transfer service provider, via the Internet. This payment information may be an account number, such as a credit, debit card number, bank account and routing information, electronic wallet, or stored value account, stored on the user input device. The user may also input information via the user input device, such as a signature, to be transferred to the money transfer service provider after the user's identity has been authenticated. Such a signature may be used to authorize the transaction and/or for comparison to a stored signature on file with the merchant (e.g., money transfer service provider) or to a signature to be provided by the user in the future (possibly at an agent location of the money transfer service provider).

Figure 1:
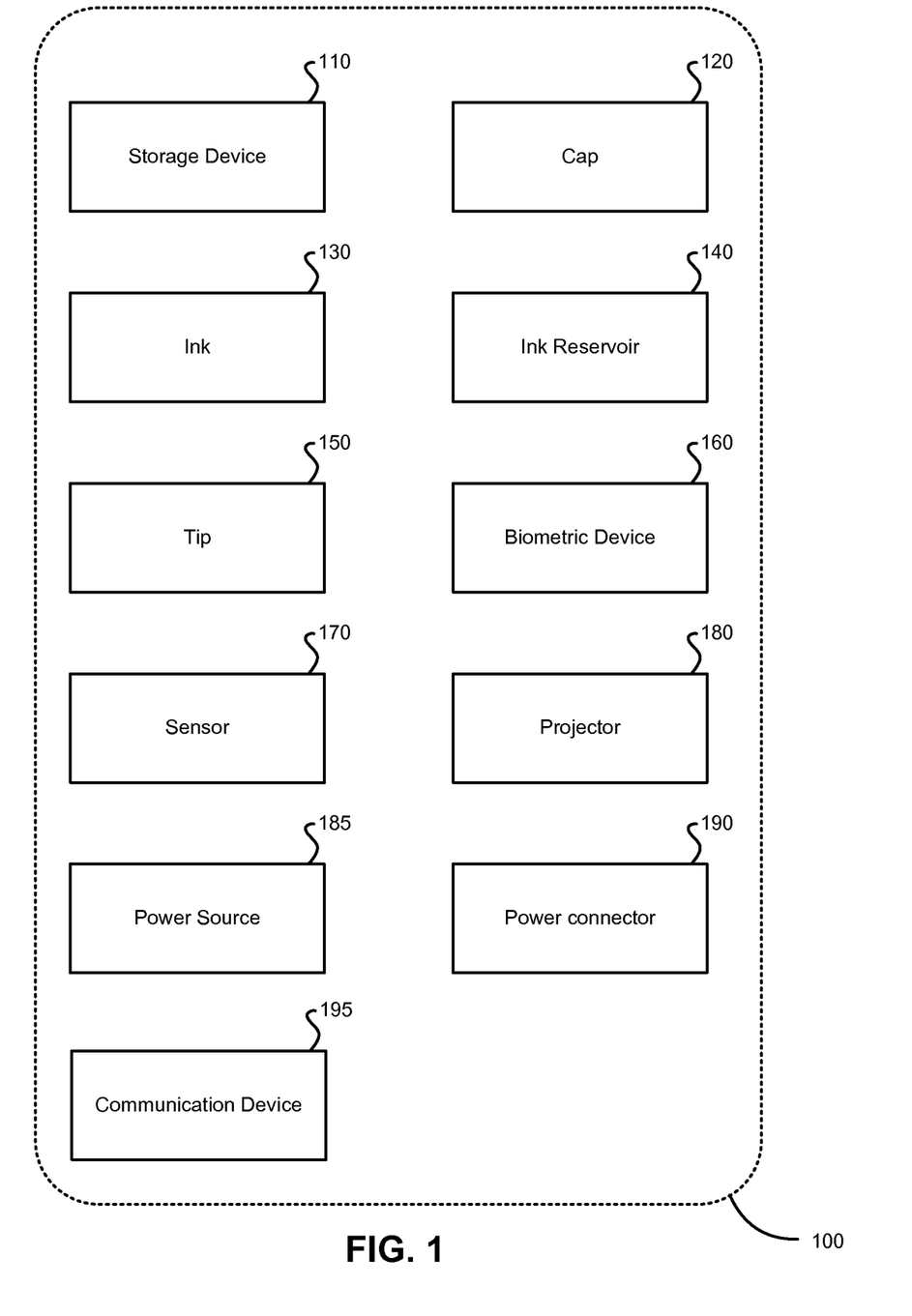
FIG. 1 illustrates a simplified block diagram of subsystems in a user input device.

Such a biometrically secured user input device, alternatively referred to as a user input device for simplicity, may consist of a several subsystems. FIG. 1 illustrates a simplified block diagram of various subsystems which may be present in a user input device 100. The user input device may have: a storage device 110, a cap 120, ink 130, an ink reservoir 140, a tip 150, a biometric authentication device 160, a sensor 170, a projector 180, a power source 185, a power connector 190, and/or a communication device 195.

The user input device may have a storage device 110. The storage device may be configured to store previously collected biometric data for one or more users. This biometric data may be stored as biometric profiles for multiple users. Allowing biometric data to be stored for multiple persons at the user input device may allow multiple users to make use of the user input device, rather than the user input device being associated with only one person. The storage device 110 may also store data linked to a particular user. In some embodiments, the storage device 110 stores financial information of the user, such as account numbers of credit card accounts, debit card accounts, stored value card accounts, etc., and/or other confidential information Some or all of the data stored on storage device 110 may be encrypted.

The user input device 100 may have a cap 120. Cap 120 may be a removable cover that may be used to cover tip 150. User input device 100 may also have ink 130 and ink reservoir 140. Ink 130 may be stored in reservoir 140. Ink reservoir 140 may be located within the user input device 100. User input device 100 may also have a tip 150. Tip 150 may be used to transfer ink 150 from the ink reservoir 140 to a writing medium, such as paper and/or a whiteboard. Tip 150 may be a ball-point. Tip 150 may be retractable into the body of the user input device. Ink reservoir 140 may be refillable. In some embodiments, ink 130 and ink reservoir 140 are not present, however, tip 150 is present. This configuration allows user input device 100 to be moved across a surface, such as paper, a white board, a computer display, hologram or any other surface, without leaving any markings.

User input device 100 also has a biometric authentication device 160. Biometric authentication device 160 may allow for biometric information to be collected from a user. Biometric authentication device 160 may be a fingerprint scanner, a voiceprint recorder, a handwriting analyzer, a pulse sensor, a retina scanner, or any other biometric device capable of identifying a user. If biometric authentication device 160 is a fingerprint scanner, the user may swipe one or more fingers over the fingerprint scanner to input his fingerprint. If biometric authentication device 160 is a voiceprint recorder, the user may be asked to speak his name or a series of words so that the user's voice may be recorded and analyzed. If biometric authentication device 160 is a handwriting analyzer, the user may be prompted to sign his name and/or write a word, sentence or symbol. The handwriting analyzer may then use the peculiarities (e.g., stroke, speed, pressure on the user input device, pressure on the writing medium, etc.) of the user's handwriting to authenticate his identity. If biometric authentication device 160 is a retina scanner, the user may be prompted to hold the retina scanner to his eye, allowing the scanner to image the user's retina. Each of these various forms of biometric authentication device 160 may allow for one or more biometric samples to be collected from the user. Each of these collected biometric sample(s) may be compared to one or more previously collected biometric samples and/or otherwise analyzed to determine if the user's identity is authentic.

The user input device 100 may have a sensor 170. Sensor 170 may be a camera that captures images of ink transfer to a writing medium and/or captures images of tip 150 moving on a writing medium or other surface. If sensor 170 is a camera, it may also be used for capturing an image of the user. Such an image of the user may be used to assist in authenticating the user's identity. Sensor 170 may measure the movement of user input device 100 to determine what the user is writing. Data captured by the sensor 170 may be stored at storage device 110 and/or may be transferred to another device, such as a computer system.

If a camera is used for the sensor, it may be possible to use the camera for other purposes. For example, the camera may be used to image the user (e.g., to compare to a previously taken picture of the user for authentication), or to image goods or services (e.g., via a barcode) that the user wishes to purchase. Such a camera might be used to image barcodes or other product codes displayed on a billboard, magazine, catalog, mailing, etc. The user may also be able to image a barcode or other code on a bill.

User input device 100 may also have a projector 180. Projector 180 may be attached to the body of the user input device 100 or may be attached to cap 120. Projector 180 may allow for an image to be projected on to a surface (or in holographic form). The image projected by projector 180 may be an image of a document. Therefore, projector 180 may project an image of a document onto a surface with user input device 100 being able to maneuver over the image projected onto the surface, giving the user the impression of "writing" on the "document."

An on-board power source 185 and power connector 190 may also be present on user input device 100. On-board power source 180 may be one or more batteries. The batteries may be rechargeable. Power connector 190 may serve to allow user input device 100 to be connected to another power source for recharging of on-board power source 185. In some embodiments, user input device 100 is always connected to some other power source via power connector 190.

User input device 100 may also have a communication device 195. Communication device 195 may allow user input device 100 to communicate with other devices, such as a computer system or mobile device. Communication device 195 may allow for either wired or wireless communication with other devices, such as via BLUETOOTH, Wi-Fi, or USB protocols. Communication device 195 may allow for biometric data of the user to be transmitted to another device. After the user's identity has been authenticated, communication device 195 may allow for data stored on storage device 110, such as financial account numbers and/or other confidential information, to be transmitted to another device.

Figure 2:
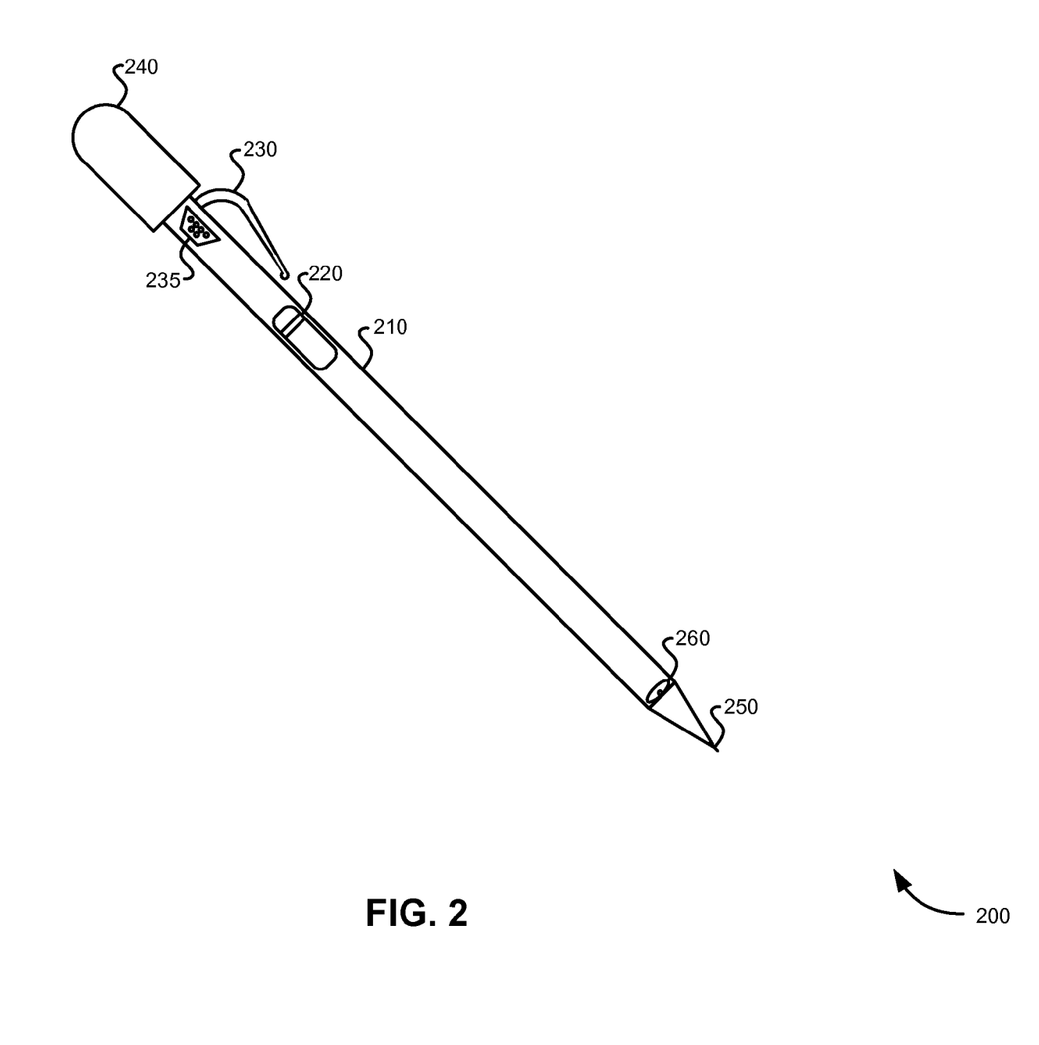
FIG. 2 illustrates an embodiment of a user input device.

The user input device 100, also referred to as the biometrically secured user input device, may be in the form of a writing instrument. FIG. 2 illustrates a simplified embodiment of such a user input device 200. User input device 200 may be user input device 100 of FIG. 1, or may represent a different user input device. A user input device 200 in the form of a writing implement may consist of a case 210, a biometric authentication device 220, a clip 230, an external communication connector 235, a cap 240, a tip 250, and a sensor 260. Not illustrated, a power supply may be housed within the pen. Also, an ink reservoir, not pictured, may be housed within in the case of the user input device to store ink (also not pictured) to be used for writing. The user input device may have a case 210. The case may be plastic, metal, wood, carbon fiber, or any other suitable material for serving as the structure for a user input device in the form of a writing instrument.

A biometric authentication device 220 may be attached to case 210. Biometric authentication device 220 may be present anywhere on the user input device 200. Biometric authentication device 220 may be biometric authentication device 160 of FIG. 1, or may represent some other biometric authentication device.

A clip 230 may be present. A clip 230 may allow the user to attach the user input device 200 to any number of items, such as a pad of paper or shirt pocket, for safe keeping.

Connector 235 may serve as both a power connector and a data transfer connector. For example, connector 235 may serve as the power connector and the communication device, such as the power connector and the communication device of FIG. 1. In some embodiments, the power connector and the communication device are separate, such as in embodiments where the communication device communicates with other devices wirelessly.

Cap 240 may represent cap 120 of FIG. 1, or may represent some other cap. Cap 240 may house or otherwise contain a projector, such as projector 180 of FIG. 1. Cap 240 may be detachable from the non-writing end of the user input device 200, and attachable to the writing end to cover tip 250 and/or sensor 260.

Also attached to case 110 of user input device 200 may be sensor 260. Sensor 260 may be the same sensor as sensor 170 of FIG. 1, or may represent some other sensor.

Ink and an ink reservoir, such as ink 130 and ink reservoir at 140 of FIG. 1, may be within case 210. Tip 250 may allow a user to write using user input device 200 and transfer ink 130 to a writing medium, such as paper, via tip 250.

Figure 3:
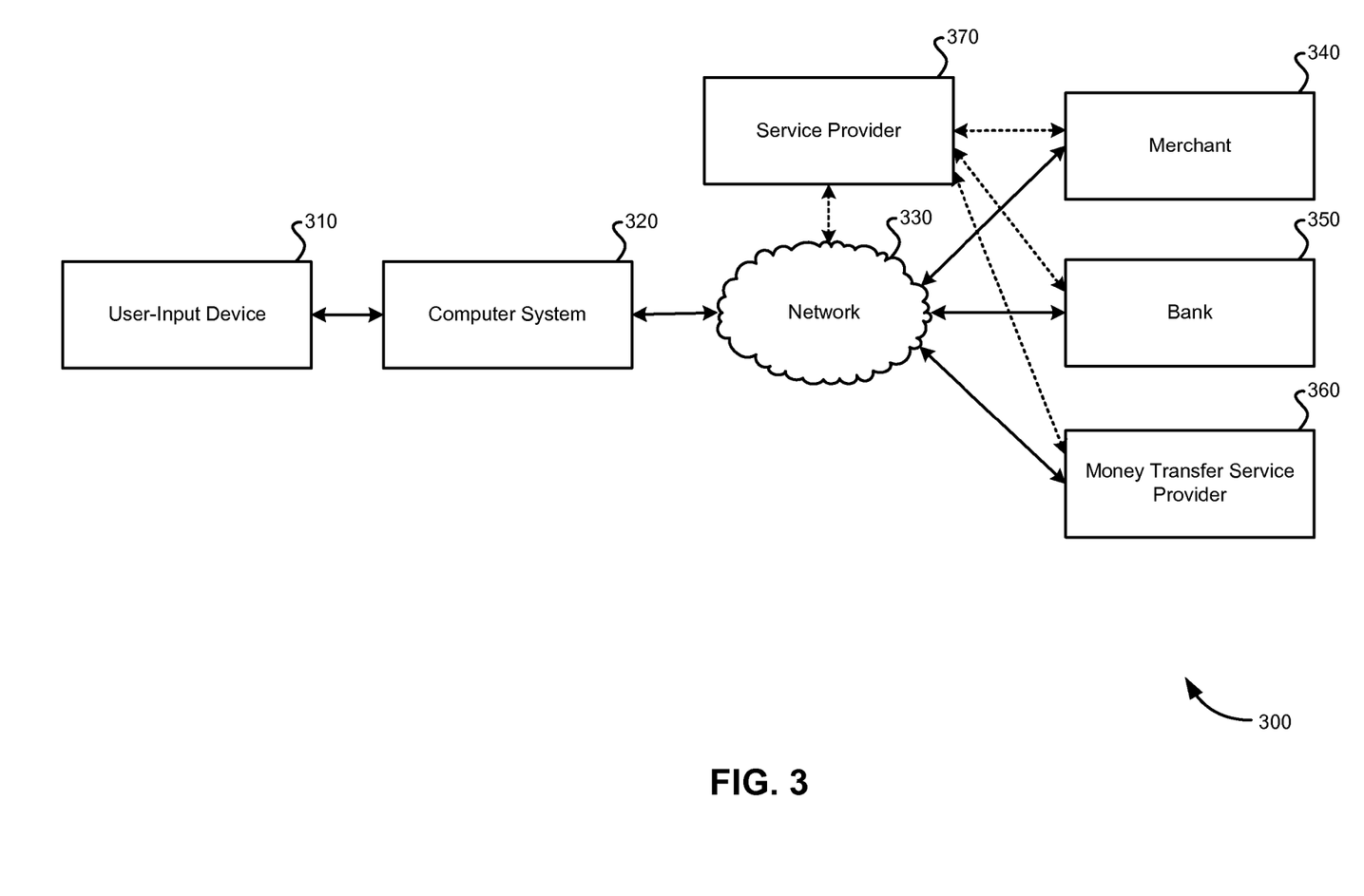
FIG. 3 illustrates a simplified embodiment of a system utilizing a user input device.

User input devices, such as user input device 100 of FIG. 1 and user input device 200 of FIG. 2, may be used in conjunction with various other devices. In FIG. 3, a simplified block diagram of a system 300 using a user input device in conjunction with other devices is illustrated. Such a system may include a user input device 310, a computer system 320, a network 330, a merchant 340, a bank 350, a money transfer service provider 360, and a service provider 370.

User input device 310 may be the user input device 100 of FIG. 1, user input device 200 of FIG. 2, or some other user input device. User input device 310 may be connected to a computer system 320. User input device 310 and computer system 320 may communicate wirelessly or via a wire.

Computer system 320 may communicate with various other entities via network 330. Network 330 may represent a public network, such as the Internet. In some embodiments, network 330 is a private network, such as a company's intranet.

Computer system 320 may use network 330 to communicate with an entity such as merchant 340. Merchant 340 may request that a user's identity be authenticated. Merchant may be for-profit or not-for-profit. This request may be routed through network 330 to computer system 320. Computer system 320 may then relay the request to user input device 310. The user may then be prompted to provide biometric information that allows the user to be authenticated. The biometric information gathered by user input device 310 may be transmitted via computer system 320 and network 330 to merchant 340. In some embodiments, merchant 340 only receives confirmation that the user's identity has been authenticated. Besides merchant 340, other entities may request that a user's identity be authenticated. Merely by way of example, two other entities that may wish a user's identity be authenticated are illustrated in FIG. 3. Bank 350 and money transfer service provider 360 are two entities that may require that a user's identity be authenticated prior to conducting a transaction with the user. For example, money transfer service provider 360 may require that user input device 310 be used to authenticate the user's identity prior to accepting the user's signature to authorize a money transfer transaction to another person or entity. A government may require that a user's identity be authenticated.

In some embodiments, computer system 320 may not communicate directly with entities such as merchant 340, bank 350, and money transfer service provider 360 via network 330. Rather, computer system 320 may communicate (represented by dotted lines) with a service provider 370 via network 330. This service provider may then communicate (represented by dotted lines) with entities such as merchant 340, bank 350, and money transfer service provider 360. In such a system, a merchant 340, or any other entity, such as a government agency, may request that a user's identity be authenticated. Such a request may be transmitted to service provider 370. Service provider 370 may then request the user's identity be authenticated via network 330 and/or computer system 320. The user may be requested to input biometric data into user input device 310. The biometric data gathered from the user at user input device 310 may be compared to a previously collected biometric sample of the user at either user input device 310, computer system 320, and/or service provider 370. Once the user's identity has been authenticated, service provider 370 may inform the requesting entity that the user's identity has been authenticated.

Figure 4:
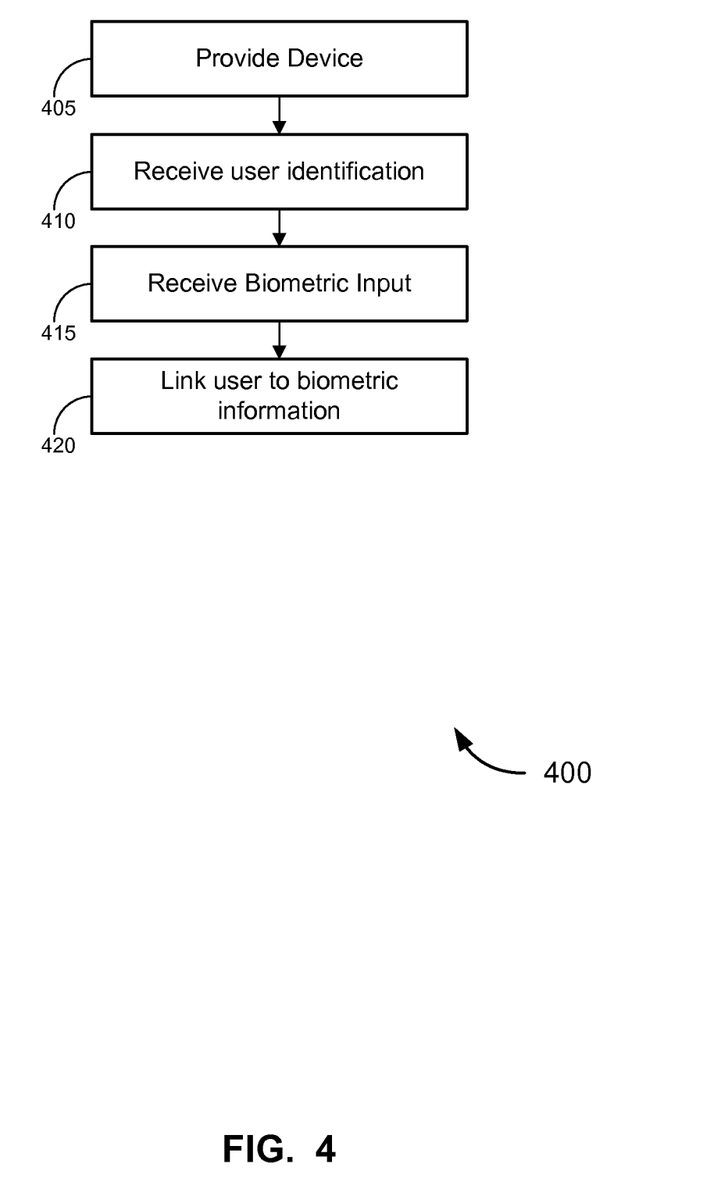
FIG. 4 illustrates a simplified embodiment of a method for gathering an initial biometric sample from a user.

The user input devices of FIGS. 1 and 2 and the system of FIG. 3 may be used to conduct a method of verifying the user's identity. However, prior to authenticating a user's identity by comparing biometric samples gathered from the user, an initial biometric sample that is known to belong to the user must be acquired for use in the comparisons. In FIG. 4, a simplified method 400 of gathering an initial biometric sample from a user is shown. At block 405, a user may be provided with a user input device. This may occur at a location where the user's identity can be confirmed, such as in person at a store or kiosk of a service provider. The service provider may be an entity that has a network of physical locations where a person may acquire or bring a user input device and have his identity verified in person by an agent of the service provider. In some embodiments, the user does not need to bring a user input device to the service provider location. For example, a money transfer service provider, such as WESTERN UNION, may be able to provide such services. The user may be required to present one or multiple forms of identification at block 410. This identification may be in the form of a passport, driver's license, birth certificate, etc. The identification may then be inspected for authenticity and compared to the user. The one or more forms of identification may be verified electronically and/or by a clerk, who may be present at the location of sale.

Biometric input may then be received from the user at block 415. The biometric input received from the user may be received at the user input device or some other device capable of receiving biometric information. The biometric input may be stored directly at the user input device and/or may be stored in a database maintained by a service provider. This sample of biometric information may be used for comparison to later samples provided by the user to authenticate the user's identity. Additionally, the user may provide a signature. The signature may serve as the user's biometric sample, or may be stored in addition to the user's biometric sample. Biometric information may be acquired from sources other than the service provider (e.g., government agency, credit bureau, etc.).

At block 420, the biometric information provided by the user may be linked to the user. This may involve linking the user's name, username, password, and/or other personal, financial and/or loyalty information of the user to the biometric information and/or the signature. A combination of the biometric information and the user's personal, financial and/or loyalty information may be used to create a biometric profile for the user. This biometric profile may be stored at the user input device at the computer, and/or at the host computer. In some embodiments, the service provider may install the biometric profile on the user's user input device. The user may not be able to modify his biometric profile without returning to the service provider. In some embodiments, the user profile may be provided to the user to be stored on the user's computer system. In still other embodiments, the user's biometric profile may be stored by the service provider.

Figure 5:
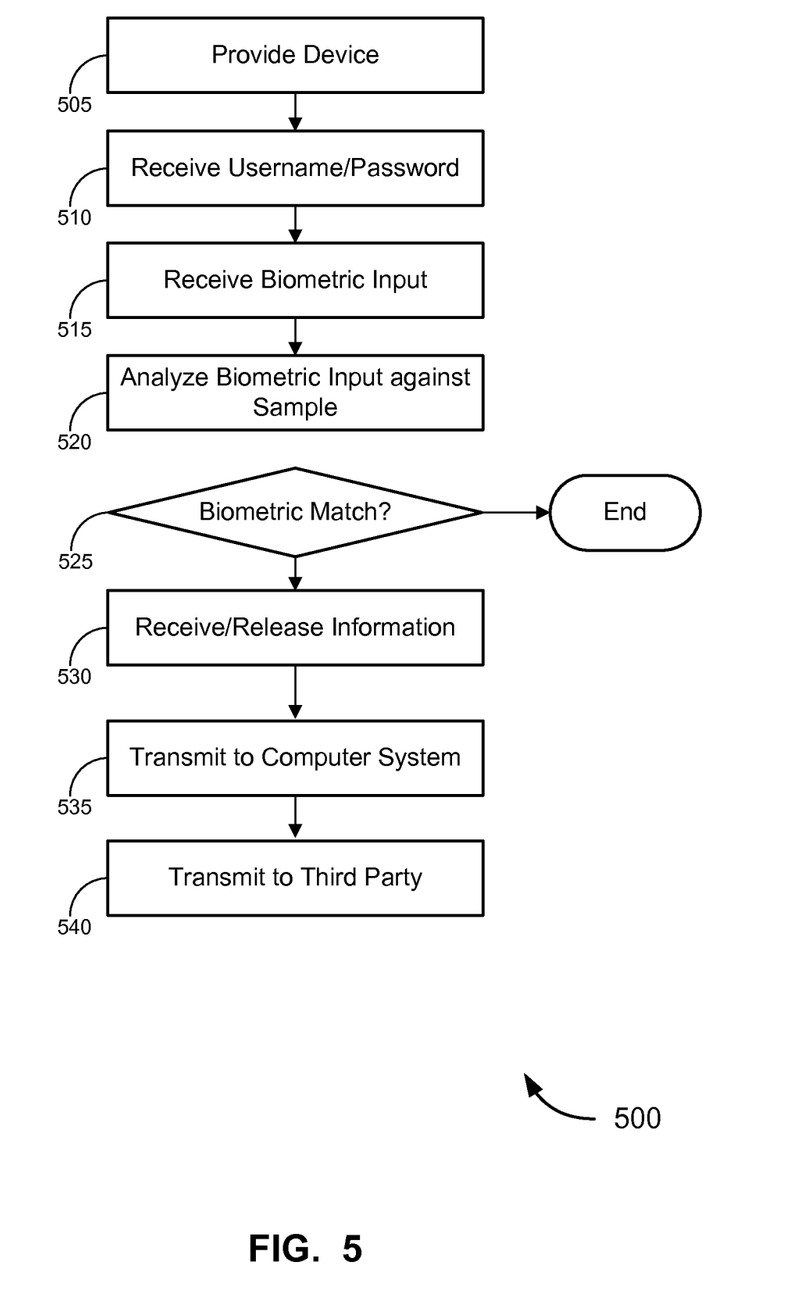
FIG. 5 illustrates a simplified embodiment of a method for authenticating a user and receiving and/or releasing information.

Once initial biometric information has been collected from the user, the resulting biometric profile may be used to authenticate the user's identity for various transactions. FIG. 5 provides a method for authenticating the user's identity and collecting user input. At block 505, the user input device may be provided to the user. As detailed in relation to FIG. 4, a biometric profile related to the user may be installed on the user input device by a service provider. Alternatively, the user may initially be able to create their own biometric profile using the user input device and a computer system. When authentication is requested, such as by one of the entities described in relation to FIG. 3, the user may be prompted to input a username and/or password. In some embodiments, the user may be requested to input other information, such as his name, birth date, Social Security number, or any other identifier capable of being used to identify the user. If more than one biometric profile for more than one user is present on the user input device, in some embodiments, an identifier is necessary. In other embodiments, only the user provides a biometric sample at block 515, so no identifier is necessary. At block 515, the user may be prompted to provide one or more biometric samples to the user input device.

Once the biometric sample(s) has been received by the user input device, it may be analyzed at block 520. If the biometric sample(s) is to be analyzed at the user's computer system, it may first be transmitted to the computers. Likewise, if the biometric sample(s) is to be analyzed by a service provider, the user input device may transmit the biometric sample(s) to the user's computer system, which in turn, may be transmitted to the service provider via a network, such as the arrangement of FIG. 3. Whether the biometric sample(s) is analyzed at the user input device, the user's computer system, or the service provider, information gathered from the user's biometric sample(s) may be analyzed and/or compared with information from an initial biometric sample(s) that is known to belong to the user gathered at an earlier time, such as described in relation to FIG. 4.

At block 525, it may be determined whether the biometric sample provided by the user matches the biometric sample that is present in the user's biometric profile. If the two samples do not match, the process may end, and the user may be denied access to information and/or prevented from conducting a transaction. If the biometric information at block 525 does match, the process may continue to block 530.

At block 530, information stored at the user input device, the user's computer system, and/or the service provider may be released now that the user's identity has been authenticated. The information that may be released might include financial account numbers, the user's social security number, biographical information, loyalty information, information or prior transactions, or any other information the user would reasonably desire to keep confidential. At block 530, the user may also be able to input information via the user input device. For example, once the user's identity has been authenticated, the user may be permitted to use the user input device to provide a signature or any other writing. Therefore, in a situation calling for a signature, multiple forms of authentication are present: the authentication of the user through biometrics, and a signature being provided, which may be compared to a previously supplied signature of the user. If information, such as a financial account number, biographical information and/or loyalty information, is stored at the user input device, it may be transmitted to the user's computer system at block 535 or to the service provider. Other information, such as a signature provided by the user, may also be transmitted to the user's computer system at block 535 or to the service provider. At block 540, the information, such as the financial account number, biographical information and/or loyalty information, and/or the signature may be transmitted to a third party, such as a service provider, a merchant, a bank, and/or a money transfer service provider such as those described in relation to FIG. 3.

Whether at the user input device, the computer system, or the third party, some or all of the user's handwriting may be converted into editable electronic text, such as in the form of a text file or a MICROSOFT WORD document. As those with skill in the art will recognize, the handwriting may be converted into editable electronic text that may be used in conjunction with any number of different file formats.

Figure 6:
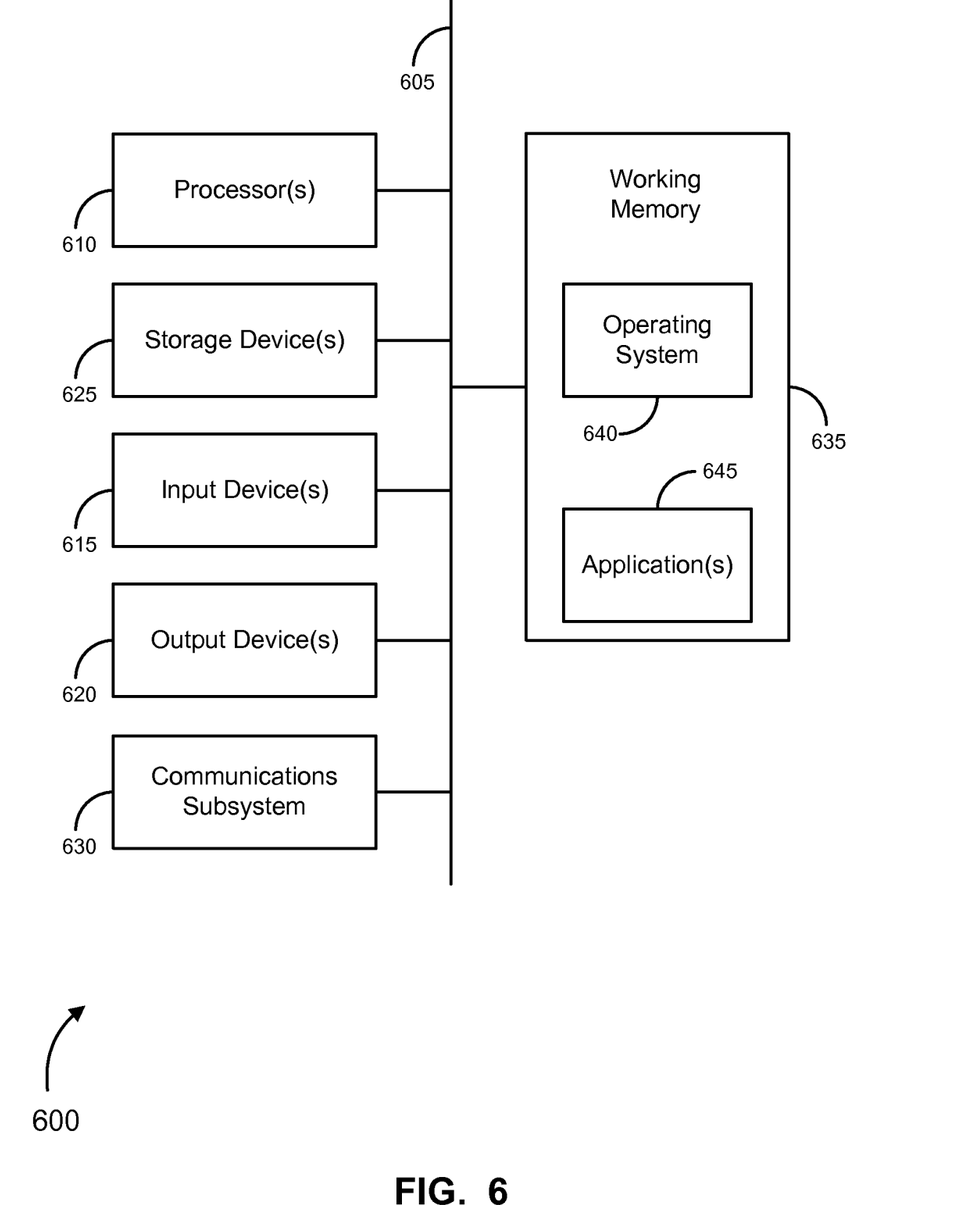
FIG. 6 illustrates a simplified block diagram of a computer system.

To perform the actions of the computer system, a third-party computer system or a computer system held by a money transfer service provider, bank, merchant, or a computer system as illustrated in FIG. 6 may be used. FIG. 6 provides a schematic illustration of one embodiment of a computer system 600 that can perform the methods provided by various other embodiments, as described herein, and/or can function as the host computer system, a remote kiosk/terminal, a point-of-sale device, a mobile device, and/or a computer system. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general purpose processors and/or one or more special purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystem 630, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 630 may permit data to be exchanged with a network (such as the network described below, to name one example), other computer systems, and/or any other devices described herein. In many embodiments, the computer system 600 will further comprise a working memory 635, which can include a RAM or ROM device, as described above.

The computer system 600 also can comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 625 described above. In some cases, the storage medium might be incorporated within a computer system, such as the system 600. In other embodiments, the storage medium might be separate from a computer system (e.g., a removable medium, such as a compact disc), and or provided in an installation package, such that the storage medium can be used to program, configure and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer-readable medium, such as one or more of the storage device(s) 625. Merely by way of example, execution of the sequences of instructions contained in the working memory 635 might cause the processor(s) 610 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 600, various computer-readable media might be involved in providing instructions/code to processor(s) 610 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 625. Volatile media include, without limitation, dynamic memory, such as the working memory 635. Transmission media include, without limitation, coaxial cables, copper wire and fiber optics, including the wires that comprise the bus 605, as well as the various components of the communication subsystem 630 (and/or the media by which the communications subsystem 630 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A handheld biometrically secured user input device having a distal end and a proximate end, comprising:
    a handheld enclosure having:
        an ink reservoir;
        ink stored in the ink reservoir;
        a tip at the distal end of the handheld biometrically secured user input device for transferring ink to a writing medium;
        a cap removably disposed on the proximate end of the handheld biometrically secured user input device for presenting a user with a visible form by projecting the visible form onto the writing medium from a projector in the cap;
        a camera in the distal end of the handheld biometrically secured user input device for:
            collecting biometric information from the user, wherein the biometric information comprises a retinal scan of the user; and
            capturing images of the ink transferred to the visible form projected onto the writing medium; and
        a communication device configured to transmit confidential information and at least a portion of the images of the ink transferred to the writing medium to a computer system based upon and after authentication of the user's identity based on the biometric information, wherein:
            the computer system converts at least a portion of the images of the ink transferred to the writing medium into electronic text; and the confidential information and at least a portion of the electronic text is used by the computer system to effectuate a financial transfer.

2. The handheld biometrically secured user input device of claim 1, wherein the confidential information comprises financial information.

3. The handheld biometrically secured user input device of claim 1, wherein the handheld biometrically secured user input device is configured to be held by the user in a position suitable for writing.

4. A method for authenticating a user and receiving user input using a handheld biometrically secured user input device having a distal end and a proximate end, the method comprising:
- receiving, by a camera at the distal end of the handheld biometrically secured user input device, biometric information from the user, wherein the biometric information comprises a retinal scan of the user;
- comparing the biometric information received from the user to previously stored biometric information received from the user;
- determining, based on the biometric information being correlated with the previously stored biometric information, if the user's identity is authenticated;
- presenting the user with a visible form by projecting the visible form onto a writing medium from a projector in a cap removably disposed on the proximate end of the handheld biometrically secured user input device;
- capturing, with the camera in the distal end of the handheld biometrically secured user input device, images of ink transferred to the visible form projected onto writing medium via a tip at the distal end from an ink reservoir of the handheld biometrically secured user input device;
- if the user's identity is authenticated:
  - accessing confidential information stored at the handheld biometrically secured user input device; and
  - transmitting, from the handheld biometrically secured user input device, the confidential information and at least a portion of the images of the ink transferred to the writing medium to a computer system, wherein the computer system converts at least a portion of the images of the ink transferred to the writing medium into electronic text, the confidential information and at least a portion of the electronic text is used by the computer system to effectuate a financial transfer.

5. The method of claim 4, wherein the comparing of the biometric information comprises comparing the biometric information received from the user to previously stored biometric information received from the user at the handheld biometrically secured user input device.

6. The method of claim 4, wherein the comparing of the biometric information comprises comparing the biometric information received from the user to previously stored biometric information received from the user at the computer system.

7. The method of claim 4, further comprising determining a user profile linked to the received biometric information from a plurality of user profiles stored at the handheld biometrically secured user input device.

8. A handheld biometrically secured user input system, comprising:
- a handheld biometric secured user input device having a distal end and a proximate end, comprising:
  - a cap removably disposed on the proximate end of the handheld biometric secured user input device, wherein the cap includes a projector configured to project a visible form onto a writing medium; and
  - a camera at the distal end configured to:
    - collect biometric information from a user to authenticate a user's identity prior to allowing access to confidential information of the user, wherein the biometric information comprises a retinal scan of the user; and
    - capture images of ink transferred to the visible form projected onto the writing medium from a tip of the distal end of the handheld biometrically secured user input device;
- a first computer-readable storage device configured to store previously collected biometric information of the user;
- a communication device configured to transmit the images of ink transferred to the writing medium to a computer system; and
- a second computer-readable storage medium, separate from the user input device, configured to store the confidential information of the user, wherein:
  - the confidential information is transmitted to the computer system only after the user's identity has been authenticated using the biometric authentication device;
  - the computer system converts at least a portion of the images of the ink transferred to the writing medium into electronic text;
  - the confidential information and at least a portion of the electronic text is used by the computer system to effectuate a financial transfer.

9. The handheld biometrically secured user input system of claim 8, wherein the confidential information comprises financial information.

10. The handheld biometrically secured user input system of claim 8, wherein the second computer-readable storage medium is maintained by a money transfer service provider.

* * * * *